Sept. 17, 1929. W. S. BACHE 1,728,588
PIPE COUPLING
Filed April 24, 1928
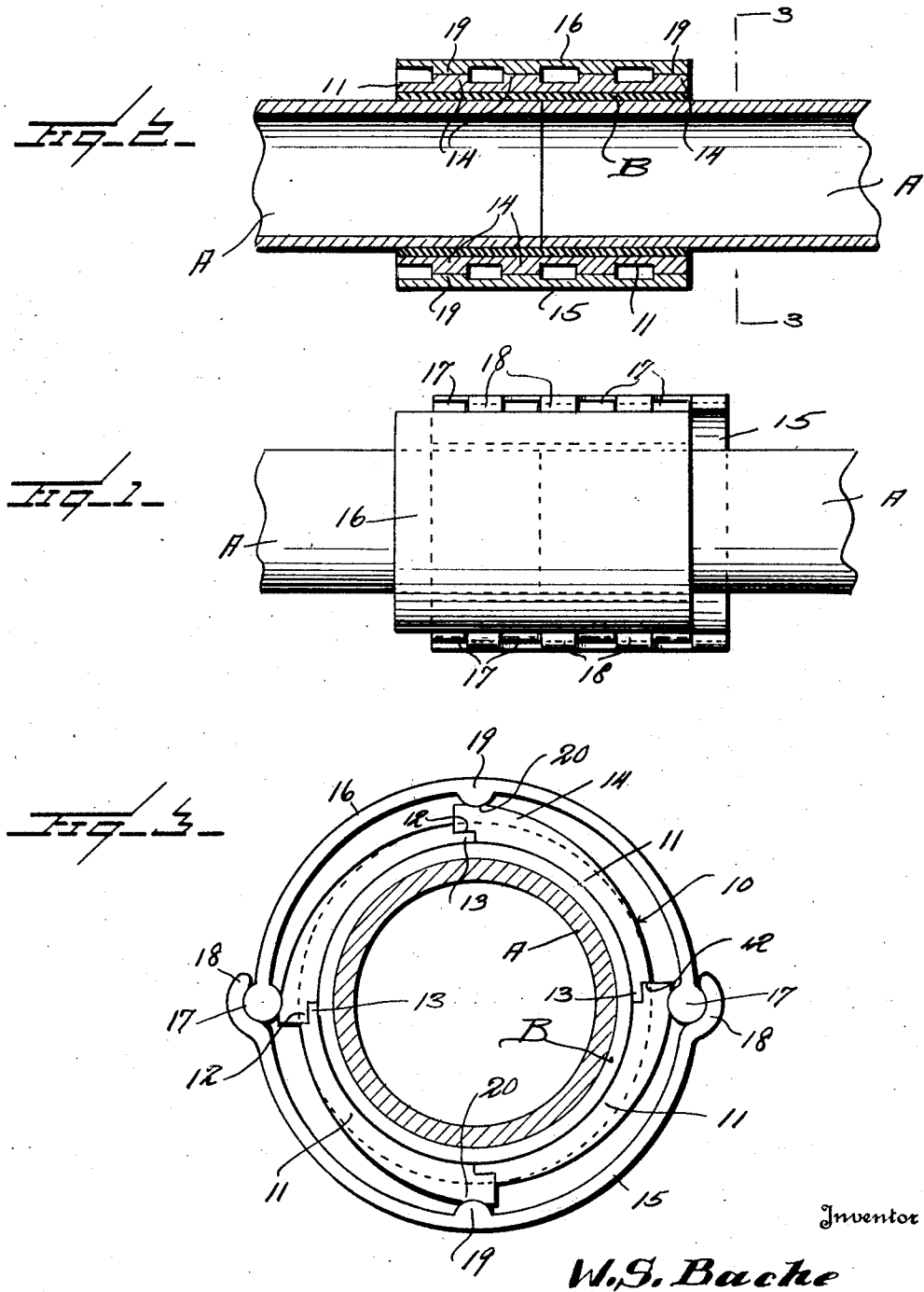
Inventor
W. S. Bache
By Watson E. Coleman
Attorney Patented Sept. 17, 1929

1,728,588

UNITED STATES PATENT OFFICE

WILLIAM S. BACHE, OF McKEESPORT, PENNSYLVANIA

PIPE COUPLING

Application filed April 24, 1928. Serial No. 272,517.

This invention relates to pipe couplings of that type wherein two joints of pipe are disposed in alignment with each other and a separable coupling is used surrounding the joints and clamped upon the pipe.

The general object of the present invention is to provide a pipe coupling of this character which is very simple, which may be readily applied or disconnected, and which will hold the two pipe sections connected in alignment with each other and joined by means of a rubber gasket or sleeve.

My invention is illustrated in the accompanying drawing, wherein:—

Figure 1 is an elevation of a coupling constructed in accordance with my invention.

Figure 2 is a longitudinal sectional view of a coupling constructed in accordance with my invention.

Figure 3 is a section on the line 3—3 of Figure 2.

Referring to this drawing, A—A designate the two sections of the pipe to be joined and B a rubber gasket into which the ends of the pipe sections A are to be slipped. My coupling comprises a sleeve 10 which is illustrated as formed of four sections 11. These sections are alike. Each section is rabbeted at 12 upon its inner face at one end and at its other end is formed with a tongue 13 to engage with this rabbet. Each section is formed with a longitudinal series of cams 14, these cams tapering gradually to the surface of the section each at its inner end and having its large end disposed at the tongued end of the section.

These sections 11 are disposed over the gasket B, as shown in Figure 3, and in order to hold the sections in place there is provided the outer sleeve or clamp formed of two sections 15 and 16. The section 16 is formed along its longitudinal edges with beads 17, while the section 15 at its longitudinal edges is formed with the outwardly curved and then inwardly turned coacting beads 18. These beads 17 are rounded upon their inner faces and, of course, are protuberant so that they are adapted to engage with and cam against two of the cams 14 of the sleeve 10. Intermediate the lateral edges of the sections 15 and 16, each of these sections is formed with the longitudinally extending, inwardly protuberant boss 19 which is also adapted to cam against one of the cams 14. Each of these cams 14 is formed upon its outer face with a slight recess or seat 20 in which the beads 17 and the bosses 19 are adapted to engage.

It will be understood that the bosses 19 and the beads 17, as regards their inner faces, constitute inwardly extending protuberances adapted to engage the cams 14 and when pressed home to the seats 20 acting to force the sections 11 inward against the rubber gasket B and clamp them in place thereon.

It will be seen from Figure 3 that the section 15 has sliding engagement with the section 16 so that one section may be put in place and then the other section slid into engagement with the first named section and then the sections rotated to cause the protuberances to come against the cams 14, this camming action causing the sections 11 to be pressed firmly in against the rubber gasket and securely hold the rubber gasket to the pipes A and hold the pipes in alignment with each other, thus locking or binding together two pieces of plain-ended pipe.

While I have illustrated certain details of construction and arrangement of parts as will appear more fully hereinafter, I do not wish to be limited to this as modifications might be made without departing from the spirit of the invention as defined in the appended claims.

I claim:—

1. A pipe coupling of the character described comprising an inner sleeve formed in a plurality of sections, each section having a tongue at one end and a rabbet at the other, the outer face of each section being formed with a plurality of circumferentially extending outwardly protuberant cams, and an outer sleeve composed of two sections having longitudinal sliding engagement with each other, each of said outer sleeve sections being formed with inwardly protruding portions adapted to engage said cams when the outer sleeve is rotated relative to the inner sleeve to clamp the inner sections upon the pipe.

2. A pipe coupling of the character described comprising an inner sleeve formed in a plurality of sections, each section having a tongue at one end and a rabbet at the other, the outer face of each section being formed with a plurality of outwardly protuberant cams, and an outer sleeve composed of two sections having longitudinal sliding engagement with each other, each of said outer sleeve sections being formed with inwardly protruding rounded portions adapted to engage said cams when the outer sleeve is rotated relative to the inner sleeve to clamp the inner sections upon the pipe, each of said cams being formed with a seat to receive the corresponding protuberant portion on the outer sleeve.

3. A pipe coupling of the character described comprising an inner sleeve formed of a plurality of longitudinally extending sections, the adjoining edges of the sections being formed to provide rabbeted joints, the outer face of each section being formed with a plurality of cams, and an outer sleeve formed in two sections, the outer edges of one section being formed with beads, the beads protruding inwardly and outwardly, the other section of the outer sleeve being formed with hollow beads adapted to have longitudinal sliding engagement with the beads of the other section, each of said sections of the outer sleeve intermediate its lateral edges being formed with inwardly protruding bosses, the first named beads and said bosses being adapted to engage the cams to force the sections inward upon a pipe.

In testimony whereof I hereunto affix my signature.

WILLIAM S. BACHE.